(12) United States Patent
Park et al.

(10) Patent No.: US 9,086,051 B2
(45) Date of Patent: Jul. 21, 2015

(54) MAINTENANCE SYSTEM FOR WIND TURBINE EQUIPMENT

(75) Inventors: Hyun Yong Park, Daejeon (KR); Jong Po Park, Masan-si (KR); Jung Hun Park, Yongin-si (KR); Jeong Hoon Lee, Daejeon (KR); Jeong Il Kim, Daejeon (KR); Byung Kyu Lee, Seoul (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 455 days.

(21) Appl. No.: 13/061,696

(22) PCT Filed: Mar. 31, 2009

(86) PCT No.: PCT/KR2009/001655
§ 371 (c)(1),
(2), (4) Date: May 31, 2011

(87) PCT Pub. No.: WO2010/024510
PCT Pub. Date: Mar. 4, 2010

(65) Prior Publication Data
US 2012/0125876 A1    May 24, 2012

(30) Foreign Application Priority Data

Sep. 1, 2008 (KR) .................. 10-2008-0086036

(51) Int. Cl.
    *B66C 17/00*      (2006.01)
    *F03D 1/00*      (2006.01)

(52) U.S. Cl.
    CPC ................ *F03D 1/003* (2013.01); *B66C 17/00* (2013.01); *F05B 2240/916* (2013.01); *F05B 2250/43* (2013.01); *Y02E 10/721* (2013.01); *Y02E 10/726* (2013.01); *Y02E 10/728* (2013.01)

(58) Field of Classification Search
USPC ................. 290/44, 55; 29/889.1, 889.21; 416/146 R, 204 R, 244 R; 254/278, 283, 254/284, 285

IPC .............. F03D 11/00,11/04, 9/00, 1/001, 1/005, F03D 1/0075, 1/06; B23P 15/04; Y02E 10/726, Y02E 10/727, 10/728; B66C 1/108
See application file for complete search history.

(56) References Cited

U.S. PATENT DOCUMENTS 4,311,434 A * 1/1982 Abe .............................. 416/142
6,652,221 B1 * 11/2003 Praenkel ........................ 415/3.1
(Continued)

FOREIGN PATENT DOCUMENTS

CN      2054495 U      3/1990
EP      1 101 936 A2      5/2001
(Continued)

OTHER PUBLICATIONS

Japanese Office Action dated Nov. 2, 2012, issued in corresponding Japanese Patent Application No. 2011-524880.
(Continued)

*Primary Examiner* — Emmanuel M Marcelo
*Assistant Examiner* — Justin Stefanon
(74) *Attorney, Agent, or Firm* — Sughrue Mion, PLLC

(57) ABSTRACT

The present invention provides a maintenance system for wind turbine equipment. The maintenance system includes a trolley support unit (130), a trolley (140), a pulley, a winch unit (150) and a door (160). The trolley support unit is provided in the nacelle so as to be movable in the longitudinal direction of the nacelle. The trolley is provided on the trolley support unit so as to be movable in the lateral direction of the nacelle. The pulley is rotatably installed in the trolley. The winch unit is connected to the pulley through a wire. The door is provided in the nacelle so that an element of the nacelle to be repaired is removed from or inserted into the nacelle through the door. Therefore, in the present invention, when maintenance or repair of an element in the nacelle is required, it can be conveniently conducted without using a separate crane.

7 Claims, 4 Drawing Sheets

(56) References Cited

U.S. PATENT DOCUMENTS

| | | | |
|---|---|---|---|
| 7,735,808 B2* | 6/2010 | Viladomiu i Guarro et al. | 254/278 |
| 7,895,744 B2* | 3/2011 | Numajiri | 29/889.1 |
| 7,931,254 B2* | 4/2011 | Teichert et al. | 254/273 |
| 7,969,037 B2* | 6/2011 | Segovia et al. | 290/55 |
| 8,104,631 B2* | 1/2012 | Stegemann et al. | 212/179 |
| 8,118,552 B2* | 2/2012 | Nies | 416/1 |
| 8,142,155 B2* | 3/2012 | Numajiri et al. | 416/132 B |
| 8,172,100 B2* | 5/2012 | Kappel et al. | 212/323 |
| 2006/0151767 A1* | 7/2006 | Wobben | 254/334 |
| 2007/0200103 A1* | 8/2007 | Viladomiu i Guarro et al. | 254/334 |
| 2010/0005656 A1* | 1/2010 | Vangsy | 29/889.1 |
| 2010/0011575 A1* | 1/2010 | Numajiri | 29/889.1 |
| 2010/0101086 A1* | 4/2010 | Amram | 29/889.1 |
| 2011/0138595 A1* | 6/2011 | Shiraishi et al. | 29/402.03 |
| 2011/0162194 A1* | 7/2011 | Sugimoto | 29/592.1 |
| 2011/0200435 A1* | 8/2011 | Pedersen | 416/146 R |
| 2011/0211955 A1* | 9/2011 | Eriksen et al. | 416/9 |
| 2012/0014775 A1* | 1/2012 | Numajiri et al. | 414/800 |
| 2012/0073134 A1* | 3/2012 | Bywaters et al. | 29/889.1 |
| 2012/0139257 A1* | 6/2012 | Tobinaga | 290/55 |

FOREIGN PATENT DOCUMENTS

| | | | | |
|---|---|---|---|---|
| EP | 1 291 521 A1 | | 3/2003 | |
| EP | 1291521 | * | 3/2003 | F03D 11/00 |
| EP | 1 677 007 A2 | | 7/2006 | |
| EP | 1677007 A2 | * | 7/2006 | F03D 11/04 |
| EP | 2520792 A1 | * | 11/2012 | F03D 1/00 |
| JP | 2005-531709 A | | 10/2005 | |
| JP | 3827321 B1 | * | 9/2006 | F03D 11/04 |
| JP | 2007-162639 A | | 6/2007 | |
| KR | 10-0581636 B1 | | 5/2006 | |
| KR | 10-2007-0115934 A | | 12/2007 | |
| WO | WO 2007/096008 A1 | | 8/2007 | |
| WO | 2007/107817 A1 | | 9/2007 | |
| WO | WO 2008/040349 A1 | | 4/2008 | |
| WO | WO 2008155983 A1 | * | 12/2008 | F03D 11/04 |

OTHER PUBLICATIONS

Chinese Office Action dated Oct. 31, 2012, issued in corresponding Chinese Patent Application No. 200980139170.5.

International Search Report, for International Application No. PCT/KR2009/001655, mailed Nov. 5, 2009, 3 pages.

* cited by examiner

MAINTENANCE SYSTEM FOR WIND TURBINE EQUIPMENT

TECHNICAL FIELD

The present invention relates, in general, to maintenance systems for wind turbine equipment and, more particularly, to a maintenance system for wind turbine equipment which is constructed such that when maintenance or repair of an element in a nacelle of the wind turbine equipment is required, the maintenance or repair can be easily and efficiently conducted.

BACKGROUND ART

Generally, wind power generating systems convert kinetic energy created by wind into electric energy. According to the installation place, the wind power generating system is classified into an onshore system or an offshore system.

Typically, such a wind power generating system includes a tower which is supported on supporting ground, a nacelle which is provided on the upper end of the tower, and a blade which is coupled to the front end of the nacelle. The nacelle has therein several devices, such as a gear box, a generator, an inverter, etc., which are necessary to generate electricity. In the wind power generating system, the blade and the gear box convert kinetic energy created by wind into high-speed kinetic energy of 1500 rpm or more. The generator coupled to the gear box converts the high-speed kinetic energy into electric energy. Electricity produced by the generator is rectified by the inverter.

Here, in the case of electronic elements installed in the nacelle, the performance thereof may be lowered after they have been used for a predetermined period of time. Some of the elements may require replacement. Particularly, in the case where the wind power generating system is used offshore, abrupt malfunction may be induced by water, salinity, etc., so that an emergency repair may be required.

As such, when maintenance or repair of the nacelle is required, for example, to replace a malfunctioned element with a new one, a separate large crane may be used, or, alternatively, the entire upper surface of the nacelle may be opened to install a crane. Meanwhile, in the case where maintenance or repair of the tower or nacelle using a mechanical structure is required, a separate mechanism is necessary and sufficient space must be ensured.

Furthermore, in the case where elements in the nacelle malfunction, repair work must be rapidly and conveniently conducted. However, in the conventional technique, a separate large crane is required, or installation of a separate crane in the nacelle is necessary. Therefore, there are disadvantages in that efficiency of repair work is low, and a sufficiently large space must be ensured on or around the tower. Moreover, in the conventional technique, the entire upper surface of the nacelle must be opened for maintenance, in other words, a nacelle roof must be opened, thus making the repair work inconvenient and complex.

DISCLOSURE OF INVENTION

Technical Problem

Accordingly, the present invention has been made keeping in mind the above problems occurring in the prior art, and an object of the present invention is to provide a maintenance system for wind turbine equipment which includes a trolley unit installed in a nacelle of the wind turbine equipment, and a winch unit provided outside the nacelle, so that when maintenance or repair of an element is required, the maintenance or repair work can be rapidly and conveniently conducted.

Technical Solution

In order to accomplish the above object, the present invention provides a maintenance system for wind turbine equipment, including: a trolley support unit provided at an upper position in the nacelle so as to be movable in a longitudinal direction of the nacelle; a trolley provided on the trolley support unit so as to be movable in a lateral direction of the nacelle; a pulley installed in the trolley so as to be rotatable; a winch unit connected to the pulley through a wire; and a door provided in a lower end of the nacelle so that an element of the nacelle to be maintained or repaired is removed from or inserted into the nacelle through the door.

The maintenance system may further include a jig provided below the pulley to hold the element to be maintained or repaired.

The winch unit may be fastened to the tower or supporting ground.

The pulley may include a drive pulley connected to the winch unit, and a driven pulley coupled to the jig. The drive pulley may comprise a plurality of drive pulleys, and the driven pulley may comprise a plurality of driven pulleys.

Advantageous Effects

In a maintenance system for wind turbine equipment according to the present invention, a trolley unit is movably provided in a nacelle of the wind turbine equipment, and a winch unit connected to the trolley unit is provided outside the nacelle. When maintenance or repair of an element in the nacelle is required, it can be rapidly and conveniently conducted without using a separate external crane.

Furthermore, an openable door is provided in the lower surface of the nacelle, so that the element to be maintained or repaired can be removed from or inserted into the nacelle through the door. Thus, space utilization in the nacelle can be optimized.

BEST MODE FOR CARRYING OUT THE INVENTION

The above and other objects, features and advantages of the present invention will be more clearly understood from the following detailed description taken in conjunction with the accompanying drawings. Hereinafter, a maintenance system for wind turbine equipment according to a preferred embodiment of the present invention will be described in detail with reference to the attached drawings.

Figure 1:
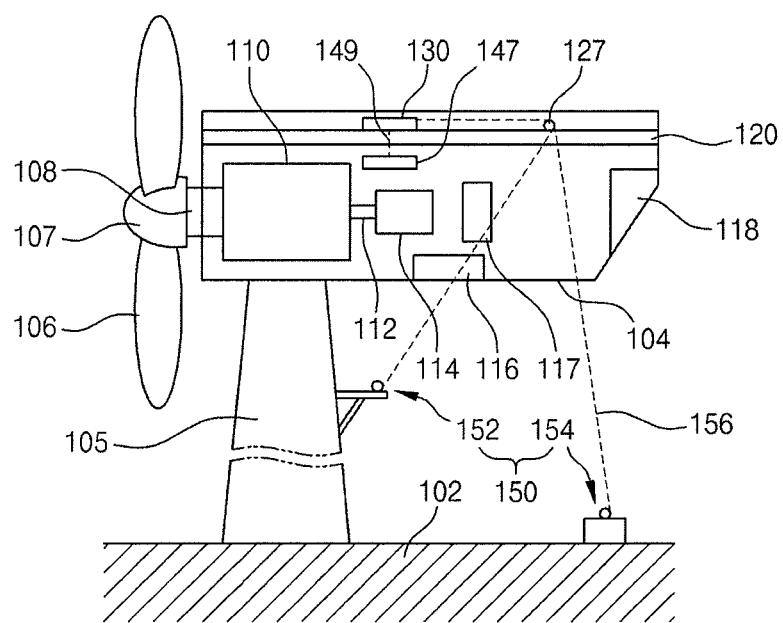
FIG. 1 is a schematic side view showing the construction of wind turbine equipment to illustrate a maintenance system for the wind turbine equipment, according to an embodiment of the present invention.
Figure 2:
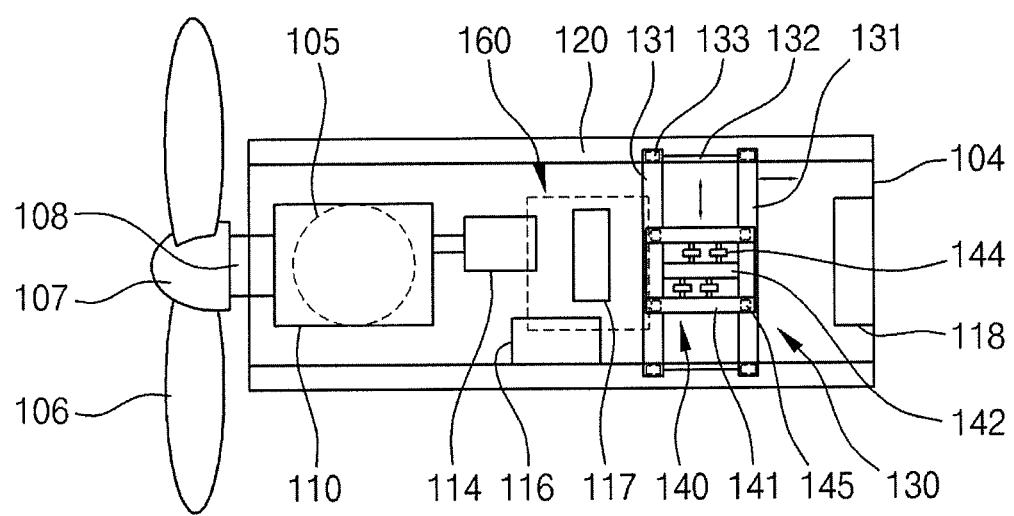
FIG. 2 is a plan view showing the construction of a nacelle of the wind turbine to illustrate the maintenance system of FIG. 1 in detail.

FIG. 1 is a schematic side view showing the construction of the wind turbine equipment to illustrate the maintenance system for the wind turbine equipment, according to the embodiment of the present invention. FIG. 2 is a plan view showing the construction of a nacelle 104 of the wind turbine to illustrate the maintenance system of FIG. 1 in detail;

The maintenance system for the wind turbine equipment according to the embodiment of the present invention will be explained with reference to FIGS. 1 and 2.

As shown in the drawings, the wind turbine equipment 100 includes a tower 105 supported on a ground 102, the nacelle 104 and blades 106. The nacelle 104 is fastened to the upper end of the tower 105. The tower 105 may have a hollow steel structure and be constructed by piling multistage cylindrical members using a crane up to a predetermined height. The blades 106 are rotated by the flow of air. The rotation of the blades 106 is increased in speed by a gear box 110 provided in the nacelle 104. The kinetic energy generated by the blades 106 is converted into electric energy by a generator 114 coupled to the gear box 110.

The blades 106 are coupled to a hub 107 by fitting the ends thereof into the hub 107. The hub 107 is connected to a main shaft 108. The main shaft 108 is rotatably coupled to the gear box 110 provided in the nacelle 104. The blades 106 are connected to the gear box 110 through the above connection structure.

The nacelle 104 has the gear box 110, the generator 114, inverters 116 and 117 and a control cabinet 118. The gear box 110 transmits high-speed rotational kinetic energy to the generator 114 through the power transmission shaft 112. The generator 114 includes a rotor (not shown) which is coupled to the power transmission shaft 112, and a stator (not shown). The rotor rotates around the stator at high speed, thus generating electricity. The inverters 116 and 117 function to remove interfering noise from electric energy generated from the generator 114.

Hereinafter, the maintenance system for the wind turbine equipment will be explained in detail.

The maintenance system includes a trolley support unit 130 which is provided at an upper position in the nacelle 104 so as to be movable in the longitudinal direction of the nacelle 104. In other words, the trolley support unit 130 moves in the nacelle 104 in the axial direction of the main shaft 108. In detail, the trolley support unit 130 moves on a nacelle frame 120 which is provided in the nacelle 104 and is firmly fastened to the upper portion thereof. Guide rails (not shown) are provided on the upper surface of the nacelle frame 120, so that the trolley support unit 130 can smoothly reciprocate on the nacelle frame 120 along the guide rails. The trolley support unit 130 includes a pair of longitudinal bars 131, lateral bars 132 which connect the longitudinal bars 131 to each other, and drive wheels 133 which are provided under both ends of the longitudinal bars 131. The drive wheels 133 roll on the nacelle frame 120 such that the trolley support unit 130 can smoothly move along the nacelle frame 120.

The maintenance system further includes a trolley 140 which is provided on the trolley support unit 130 so as to be movable in the lateral direction of the nacelle 104, a drive pulley 144 which is provided in the trolley 140, and a winch unit 150 which is connected to the drive pulley 144 through a wire 156.

The trolley 140 includes an outer frame 141, an inner frame 142 and drive wheels 145. The drive pulley 144 is rotatably installed between the outer frame 141 and the inner frame 142. The drive wheels 145 roll on the longitudinal bars 131 of the trolley support unit 130 such that the trolley 140 can smoothly move along the trolley support unit 130. Here, guide depressions (not shown) may be respectively formed in the upper surfaces of the longitudinal bars 131, so that the drive wheels 145 move along the longitudinal bars 131 without being undesirably displaced therefrom.

The winch unit 150 is provided outside the nacelle 104 and may comprise a winch 154 which is installed on the ground 102, or a winch 152 which is installed on the tower 105. The winch unit 150 moves a jig 147 connected to the wire 156 upwards or downwards by adjusting the wire 156 which is wound or unwound by the winch unit 150. Here, ground 102 means a concept which can be applied not only to the land but also the sea. In the case of the sea, the winch unit 150 can be fastened, for example, to a SEP barge (a self elevated platform barge).

Meanwhile, to maintain or repair a relatively light device of the wind turbine equipment, a temporary winch may be installed on the trolley 140. For example, in the case of a relatively small device having a weight less than 1 ton, the maintenance thereof can be conducted without using the external winch unit. Furthermore, in this case, the jig is unnecessary.

A door 160 is openably provided in the lower surface of the nacelle 104. The door 150 provides a passage through which elements to be maintained are moved out of or into the nacelle 104. That is, in the conventional art, the upper end of the nacelle 104 must be opened for maintenance. However, in the present invention, only a portion corresponding to space required for maintenance is cut, and the door is provided on the cut portion, thus increasing the space utilization.

Figure 3:
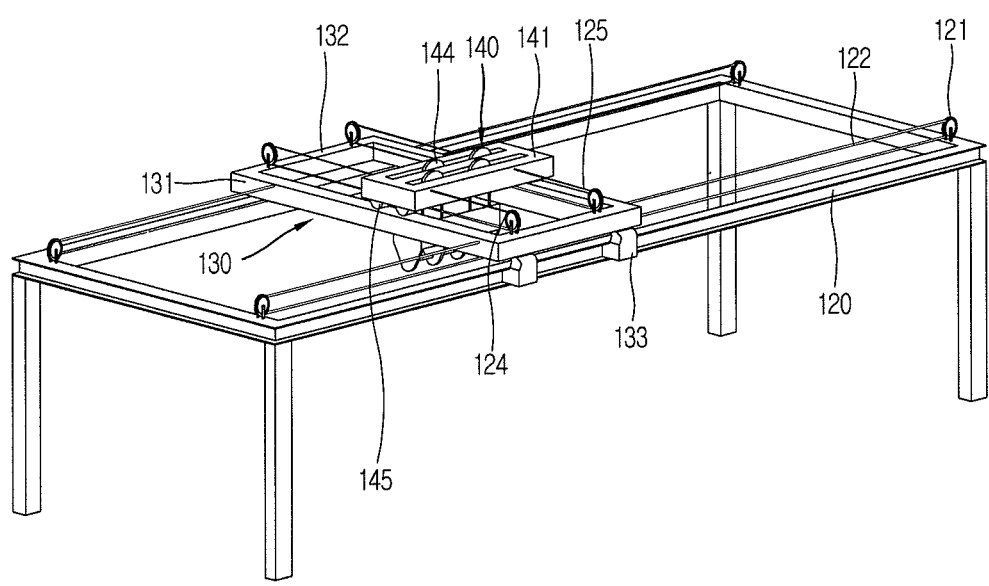
FIG. 3 is a perspective view showing a relationship between a trolley support unit and a trolley provided on the trolley support unit according to the present invention.
Figure 4:
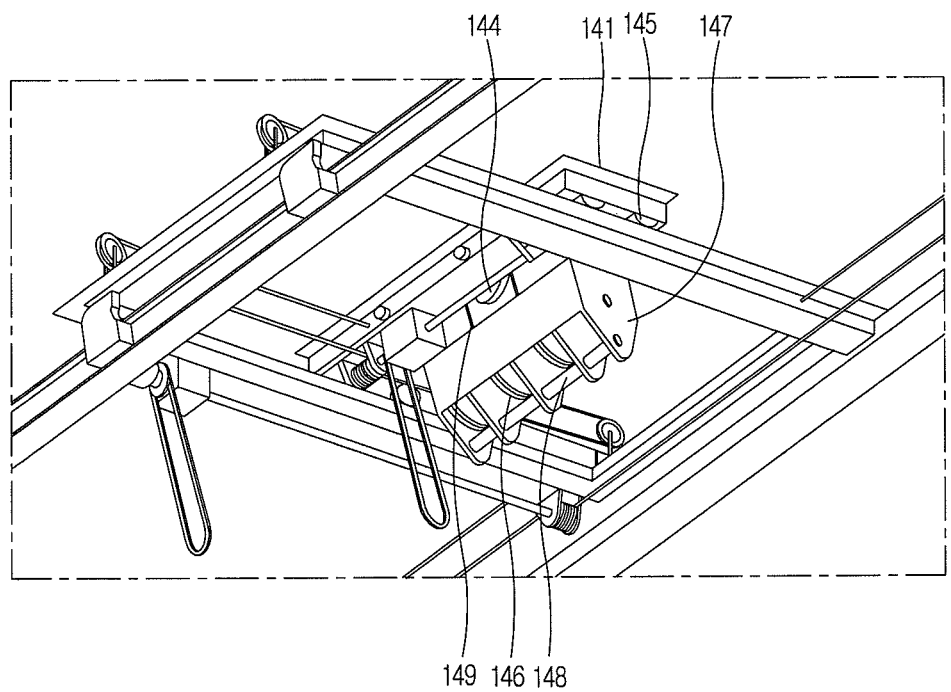
FIG. 4 is a perspective view illustrating connection between pulleys and a jig according to the present invention.

FIG. 3 is a perspective view showing a relationship between the trolley support unit 130 and the trolley 140 provided on the trolley support unit 130. FIG. 4 is a perspective view illustrating the connection between the pulleys and the jig 147 according to the present invention. Hereinafter, the relationship between the trolley support unit 130 and the trolley 140 will be explained in detail with reference to FIG. 3.

The trolley support unit 130 further includes four first fixed pulleys 121 which are respectively provided on the corners of the upper surface of the nacelle frame 120, and first guide wires 122 which are connected between the first fixed pulleys to guide the trolley support unit 130 moving on the nacelle frame 120.

Furthermore, four second fixed pulleys 124 are respectively provided on the corners of the trolley support unit 130, that is, at the junctions between the longitudinal bars 131 and the lateral bars 132. Second guide wires 125 are connected between the second fixed pulleys 124 in the direction in which the trolley 140 moves. Thus, the trolley 140 can smoothly move on the upper surface of the trolley support unit 130. As necessary, the number of first fixed pulleys 121 or second fixed pulleys 124 may be varied, in other words, be more or less than four.

The trolley support unit 130 moves in the nacelle 104 in the longitudinal direction of the nacelle 104. The trolley 140 moves on the trolley support unit 130 in the lateral direction of the nacelle 104. Hence, on the coordinates formed when seen in the plan view of the nacelle 104, the trolley 140 can be seen from all points on the coordinates and be thus disposed above any device installed in the nacelle 104.

The connection between the pulleys and the jig 147 will be explained in detail with reference to FIG. 4. The pulleys comprise the drive pulley 144 and the driven pulley 146. The drive pulley 144 is connected to the driven pulley 146 by a wire 149.

The jig 147 is provided below the trolley 140. The jig 147 includes a hanging rod 148 on which elements to be repaired are hung to move the elements in the nacelle 104. The driven pulley 146 is rotatably provided in the jig 147. The drive pulley 144 and the driven pulley 146 comprise a plurality of drive pulleys 144 and a plurality of driven pulleys 146 to reduce a load applied to the jig 147. In addition, a load applied to the wire 149 can be reduced using a movable pulley structure.

The overall operation of the maintenance system for the wind turbine equipment will be explained in detail with reference to FIGS. 1 through 4.

When maintenance or repair is required because of malfunctioning of a device in the nacelle 104, the trolley support unit 130 moves on the nacelle frame 120 in the longitudinal direction of the nacelle 104 and, thereafter, the trolley 140 moves on the trolley support unit 130 in the lateral direction of the nacelle 104, thus being disposed above the device to be maintained or repaired. The movement of the trolley support unit 130 and the trolley 140 can be realized by a separate drive means. Typically, because the trolley 140 must be exactly moved to the desired position by the user, a manual device may be used as the drive means. The manual device may form a closed loop system using a chain block. This drive means can be derived by the well-known technique, therefore further explanation is deemed unnecessary.

When it is desired to move the jig 147 provided under the trolley 140, for example, to replace an element to be repaired with a new one, the winch unit 150 is operated. In detail, the wire 156 is wound around or unwound from the winch unit 150. Here, the tension of the wire 156 is supported by a direction converting pulley 127 installed in the nacelle 104. In addition, the power transmission direction is converted by the direction converting pulley 127. After the jig 147 is moved upwards or downwards and thus disposed at a position spaced apart from the desired element by an appropriate distance, the element is reliably held by the jig 147. Thereafter, the jig 147 is moved upwards to an appropriate height by operating the winch unit 150.

Subsequently, the door 160 provided in the lower end of the nacelle 104 is opened to preliminarily prepare for removal of the element from nacelle 104. The jig 147 is thereafter disposed above the door 160 by horizontally moving the trolley support unit 130 and the trolley 140. The element held by the jig 147 is subsequently discharged out of the nacelle 104 through the door 160 by operating the winch unit 150.

A process of installing a new element in the nacelle 104 is conducted in the reverse of the order of removing the malfunctioned element, therefore further explanation will be skipped.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A maintenance system for wind turbine equipment including a nacelle having a gear box and a generator to generate electricity using wind power, a blade mechanically connected to the gear box, and a tower supporting the nacelle on an upper end thereof, the maintenance system, comprising: a trolley support unit provided at an upper position in the nacelle so as to be movable in a longitudinal direction of the nacelle;
   a trolley provided on the trolley support unit so as to be movable in a lateral direction of the nacelle;
   a pulley installed in the trolley so as to be rotatable, the pulley being contained within the nacelle;
   a winch unit disposed outside of the nacelle and connected to the pulley through a wire;
   a door provided in a lower end of the nacelle so that an element of the nacelle to be maintained or repaired is removed from or inserted into the nacelle through the door; and
   a jig provided in the nacelle so as to be below the trolley, and connected to the pulley from below the pulley, configured to be raised and lowered with respect to the trolley, and to hold the element to be maintained or repaired,
   wherein the pulley comprises a drive pulley connected to the winch unit and a driven pulley coupled to the jig so as to be raised and lowered with the jig, and
   wherein the drive pulley is connected to the driven pulley through a second wire.

2. The maintenance system according to claim 1, wherein the winch unit is fastened to the tower or supporting ground.

3. The maintenance system according to claim 1, wherein the drive pulley comprises a plurality of drive pulleys, and the driven pulley comprises a plurality of driven pulleys.

4. The maintenance system according to claim 1, wherein the driven pulley is provided below the drive pulley and an axis of the driven pulley is positioned approximately perpendicular to an axis of the drive pulley.

5. A maintenance system for wind turbine equipment including a nacelle having a gear box and a generator to generate electricity using wind power, a blade mechanically connected to the gear box, and a tower supporting the nacelle on an upper end thereof, the maintenance system, comprising:
   a trolley support unit provided at an upper portion of the nacelle, so as to be contained within the nacelle, and configured to be movable in a longitudinal direction of the nacelle;
   a trolley provided on top of the trolley support unit and contained within the nacelle, and configured to be movable in a lateral direction of the nacelle and the longitudinal direction of the nacelle via the trolley support unit;
   a rotatable pulley installed in the trolley so as to be contained within the nacelle, the pulley configured to move in the longitudinal direction and the lateral direction of the nacelle via movement of the trolley;
   a winch unit disposed outside of the nacelle and connected to the pulley through a wire;
   a door provided in a lower portion of the nacelle so that an element of the nacelle to be maintained or repaired is removed from or inserted into the nacelle through the door; and
   a jig connected to the pulley from below the pulley, to hold the element to be maintained or repaired, wherein the jig is configured to be raised and lowered with respect to the trolley, and movable in the longitudinal direction and the lateral direction of the nacelle via movement of the pulley,
   wherein the pulley comprises a drive pulley connected to the winch unit and a driven pulley coupled to the jig so as to be raised and lowered with the jig, and
   wherein the drive pulley is connected to the driven pulley through a second wire.

6. The maintenance system according to claim 5, wherein the drive pulley comprises a plurality of drive pulleys, and the driven pulley comprises a plurality of driven pulleys.

7. The maintenance system according to claim 6, wherein the plurality of driven pulleys is provided below the plurality of drive pulleys and an axis of the driven pulley is positioned approximately perpendicular to an axis of the drive pulley.

\* \* \* \* \*